Dec. 1, 1931.  H. WAYER  1,833,924
VALVE PROTECTOR
Filed Sept. 3, 1929

INVENTOR.
Henry Wayer
BY J. J. Newton
ATTORNEYS.

Patented Dec. 1, 1931

1,833,924

UNITED STATES PATENT OFFICE

HENRY WAYER, OF COLUMBUS, OHIO

VALVE PROTECTOR

Application filed September 3, 1929. Serial No. 390,104.

My invention relates to a valve protector and particularly to a device for protecting the valves of containers of gases under pressure.

The object of my invention is to provide a valve protector that may quickly and easily be detached from the gas container, but which will be securely held in place during transportation and rough handling of the gas container.

Another object of my device is to provide a device that will prevent the loss of the protector or cap, which the consumer now often fails to return to the owners of the gas containers or cylinders because of the frequent difficulty found in replacing the caps after being removed, due to some damage that has been done the threads on the cap flange by careless handling.

Another object of the invention is to protect the threads now common on standard caps by surrounding them with a protecting ledge or flange that will prevent the threads from coming in contact with objects that heretofore have mutilated the threads.

Another object is to provide a cap in two separable parts, one of which may remain permanently screwed on to the standard cap flange, while the other part may be quickly removed from over the valve.

With these and other objects in view, which will be apparent as the description proceeds, I will now describe my invention in connection with the accompanying drawings, in which Fig. 1 is a plan view of one part of my valve protector;

1 is a flange projecting from a screw threaded cylindrical part 2. On the other side of the flange 1 from the screw threaded portion 2 there is a cylindrical portion 3 having wide lugs 4—4.

Figure 7:
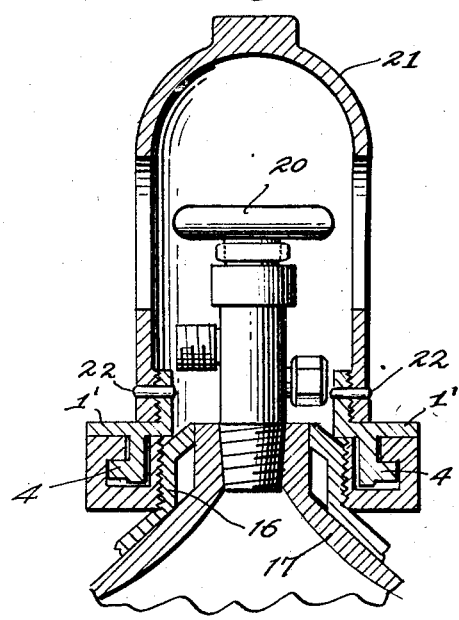
Fig. 7 is a sectional view of my device as applied to a standard gas container.

Of the parts shown in Figs. 4, 5 and 6, 9 is an internal screw thread adapted to receive the standard flange cap 6 of Fig. 7. This screw thread 9 is made in an upwardly extending portion 10 which is surrounded by a groove 11 having widened portions 12 and overhanging flanges 13—13. The cap flange 16 is of standard construction and is fitted securely to the gas container 17 so as to securely hold the cap flange on to the container. 20 is the standard plug or valve screwed into the neck of the container and which should be protected by the cap portion 21 to prevent the plug or valve 20 from being broken off or otherwise injured or accidentally turned during transportation or handling of the container.

Figure 3:
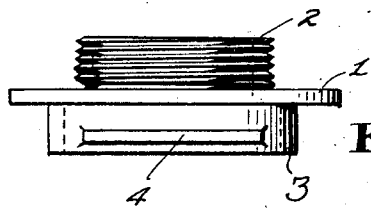
Fig. 3 is an elevation of the same part shown in Figs. 1 and 2.
Figure 4:
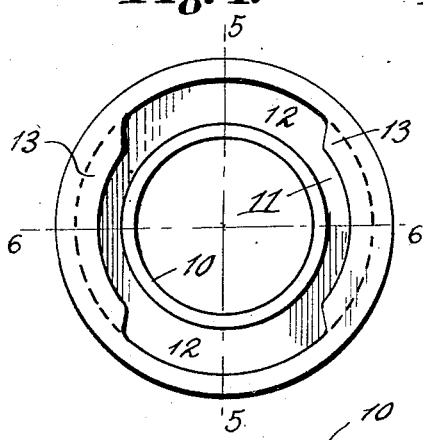
Fig. 4 is a top plan view of another part of my device.
Figure 5:
Fig. 5 is a sectional view on the line 5—5 of Fig. 4.
Figure 6:
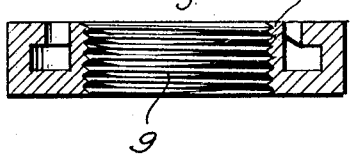
Fig. 6 is a section on the line 6—6 of Fig. 4.

The parts of my device shown in Figs. 4, 5 and 6 may be screwed on to the cap flange 16 and unscrewed therefrom or it may remain permanently attached thereto. The cap portion 21 is screw threaded as shown in Fig. 7 at its bottom portion and may be screwed on to the portion 2 of the parts shown in Figs. 1, 2 and 3. I may hold these parts together and keep one from unscrewing from the other by pins 22. After the parts shown in Figs. 4, 5 and 6 are screwed on to the cap flange 16 the parts shown in Figs. 1, 2 and 3 may be attached quickly and easily by inserting the part 4 in the widened portion 12 of the groove 11 and giving it a quarter turn, thus bringing the portion 4 under the widened portion 13 where it will be held until given another quarter turn.

Figure 1:
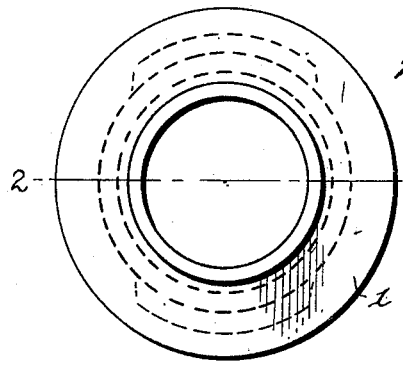
Figure 2:
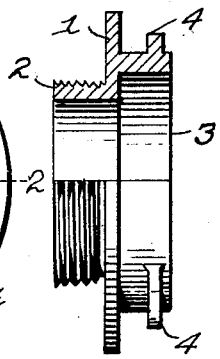
Fig. 2 is a view partly in section on the line 2—2 of Fig. 1.

The cap 21 including the parts shown in Figs. 1, 2 and 3 when fastened together as shown in Fig. 7 may be easily attached to the parts shown in Figs. 4, 5 and 6 by placing the cap over the valve 20 and bringing the portion 4 into the groove 12 and then giving the cap a quarter turn. To remove the cap 21 from the valve 20 the cap is given a quarter turn and raised, leaving the parts shown in Figs. 4, 5 and 6 permanently attached to the cap flange 16. This will protect the cap flange 16 from mutilation by a part that will resist the ordinary rough handling of these parts, and it will be observed that none of the parts of my device will be mutilated by rough handling, and the caps will not be lost because the users cannot replace them by reason of the mutilation of some of the attached portions. Moreover, it will be observed that my cap 21 may be easily attached and moved from the gas container by a quarter turn of the cap.

Figure 8:
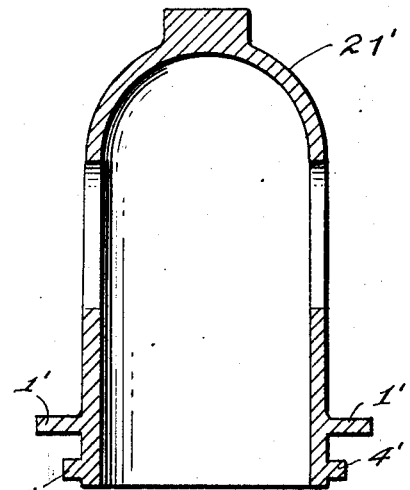
Fig. 8 is a sectional view of a modification of my device.

In Fig. 8 I have shown a modification of my device in which, in effect, the cap and the portion shown in Figs. 1, 2 and 3 are made in one piece, the cap 21' being integral with the flange portion 1' and with the projecting portion 4'—4'. In this modification there must, of course, be provided a part similar to the parts shown in Figs. 4, 5 and 6 to attach the cap 21 to the flange cap 16.

While I have described my device in detail, it is apparent that many modifications thereof may be made without departing from the spirit of the invention, the essential features of which will be included in the claims.

What I claim as new is:

1. A valve protector for a gas container that has a standard screw threaded cap flange, said protector comprising a first lowest portion with internal screw threads extending from bottom to the top thereof and adapted to screw on to the cap flange, said first portion having a groove therein opening upwardly with widened portions and an overhanging flange portion, a cap portion adapted to enter the widened portions of said groove and by a quarter turn to be brought under said overhanging flange portion to hold the cap portion firmly attached to said first portion.

2. A valve protector for a gas container that has a standard screw threaded cap flange, said protector comprising a first portion internally screw threaded and adapted to screw on to the cap flange, said first portion having an annular groove therein opening upwardly being bounded on both sides by upwardly extending concentric flanges on said first portion with diametrically opposite widened portions and diametrically opposite overhanging flange portions, a cap portion having at its lower end an annular flange and integral diametrically opposite portions under the flange, adapted to enter the widened portions of said groove by a slight turn to be brought under said overhanging flange portion to hold the cap portion firmly attached to the cap flange.

3. A valve protecting cap comprising a grooved first portion adapted to be attached to a standard cap flange and permanently remain so attached, a cap portion adapted to extend over the valve to protect it and internally screw threaded at its lower end, and a third intermediate portion having an upwardly extended external screw threaded portion screwed into the lower end of the cap portion, said third intermediate portion having an outwardly extending flange to fit over the top of said first portion and a downwardly extending portion to extend into the groove in said first portion, there being a bayonet joint construction between said first and third portions.

In testimony whereof I affix my signature.

HENRY WAYER.